United States Patent Office 3,417,162
Patented Dec. 17, 1968

3,417,162
EPOXY MODIFIED VINYL COPOLYMERS OF α,β-UNSATURATED DICARBOXYLIC ACID PARTIAL ESTERS
Robert L. Zimmerman and Lieng-Huang Lee, Midland, Mich., assignors to The Dow Chemical Company, Midland, Mich., a corporation of Delaware
No Drawing. Continuation-in-part of application Ser. No. 97,725, Mar. 23, 1961. This application Nov. 28, 1966, Ser. No. 597,234
10 Claims. (Cl. 260—837)

ABSTRACT OF THE DISCLOSURE

This application relates to epoxy compositions containing homogeneous, non-equimolar copolymers of styrene compounds and partial esters of α,β-unsaturated dicarboxylic acid anhydrides. The compositions are useful as coatings and in making laminates.

---

The present invention relates to polymer compositions and is more particularly concerned with compatible thermosetting compositions of homogeneous copolymers of vinyl aromatic compounds and α,β-unsaturated dicarboxylic acid partial esters and epoxy compounds. This application is a continuation-in-part of our copending application Ser. No. 97,725 filed Mar. 23, 1961.

We have found that hard, tough, glossy, transparent and adherent continuous coatings and laminates having excellent stain, detergent and solvent resistance are obtained from compositions of (A) a homogeneous copolymer of (1) from 67 to 97, preferably 80 to 95, mole percent of a vinyl aromatic compound and (2) correspondingly, from 33 to 3, preferably 20 to 5, mole percent of an α,β-unsaturated dicarboxylic acid anhydride which is mono-esterified from 50 to 120 mole percent with a member of the group consisting of primary and secondary alkyl, cycloalkyl and benzenoid aromatic alcohols containing from 1 to 21 carbon atoms and $C_3$ or $C_4$ unsaturated aliphatic primary and secondary alcohols having the —C=C— group at least one carbon removed from the OH and (B) an epoxide having an epoxide equivalent weight of from 44 to 1000, preferably from 70 to 550, in a ratio to the vinyl aromatic copolymer such that the epoxide to anhydride, including COOH, ratio is from 0.2 to 2.5, preferably from 0.5 to 2.0. It is further preferred that the thermosetting composition contains at least 60 parts by weight of the vinyl aromatic copolymer which preferably contains at least 50 weight percent of the vinyl aromatic monomer. The vinyl aromatic partial ester polymer should preferably have a molecular weight characterized by 10% solution viscosity in methyl ethyl ketone at 25° C. of 0.5 to 20 cps., preferably 0.9 to 10 cps.

Vinylidene compounds which are suitable include, for example, styrene, vinyl toluene, t-butyl styrene, mono- and dichlorostyrene, α-methyl styrene, mixtures thereof and the like.

α,β-Unsaturated dicarboxylic anhydrides which are suitable include, for example, maleic anhydride, chloromaleic anhydride, citraconic anhydride, itaconic anhydride, aconitic anhydride and the like.

The copolymers employed in this invention are "homogeneous," that is, they are of exceptional copolymer composition homogeneity. They are essentially gel-free and optically transparent, having optical transmissions above about 80%.

At least 90 percent of the copolymer must have an anhydride component composition within a range of 5 percent, and preferably within a range of 2 percent by fractionation analysis. For example, a copolymer prepared by the method of Ser. No. 33,376 filed June 2, 1960, and containing 5.89 weight percent maleic anhydride and having a viscosity of 1.27 cps. with 0.6 percent volatiles, was fractionated by fractional precipitation of a 50 g. sample in 260 g. of toluene with Skellysolve B 96–99° C.

| Fraction: | cc. Skellysolve | Wt., g. | Wt. Percent MA |
|---|---|---|---|
| 1 | 275 | 14.56 | 5.87 |
| 2 | 25 | 14.57 | 5.52 |
| 3 | 50 | 9.82 | 4.72 |
| 4 | 150 | 3.61 | 4.14 |
| 5 | 500 | 2.32 | 3.22 |
| 6 | Residue | 2.37 | 8.92 |
| | | 47.25 | |

A second 50 g. sample having a viscosity of 1.42 cps. and 2.1 percent volatiles, prepared as above but containing 10.25 weight percent maleic anhydride, and fractionated in the same manner, had the following distribution:

| Fraction: | cc. Skellysolve | Wt., g. | Wt. Percent MA |
|---|---|---|---|
| 1 | 175 | 10.90 | 12.0 |
| 2 | 25 | 16.65 | 10.9 |
| 3 | 50 | 10.62 | 10.1 |
| 4 | 150 | 5.80 | 8.75 |
| 5 | 500 | 1.34 | 7.71 |
| 6 | Residue | 1.98 | 16.6 |
| | | 47.29 | |

The high uniformity of these polymers is shown by the fact that better than 95 percent of the polymers have MA contents which fall within a 5 percent by weight range. An unfractionated portion of the latter samples, 1/8" thick specimen, transmitted 87 percent of white light.

Highly utile products are obtained employing an esterification of from about 50 to about 120 mole percent, where 100 mole percent represents the monoester, and 200 mole percent would represent the diester. Alcohols which may be employed include, for example, cyclohexyl alcohol, cyclopentyl alcohol, substituted cycloalkyl alcohols, allyl alcohol, methallyl alcohol, ethyl alcohol, isooctyl alcohol, lauryl alcohol, stearyl alcohol, decyl alcohol, butyl alcohol, and the like.

These half esters are generally soluble in acetone, alcohol, 1% caustic and xylene. They are generally insoluble in kerosene and of slight solubility in water.

Half ester copolymers useful in the present invention are preferably prepared from the vinyl aromatic monomer and acid maleate by solution polymerization, although bulk, emulsion or suspension polymerization methods may also be employed. Two requirements of the polymerization method are (1) that it results in substantially uniform copolymer composition, and (2) that the copolymer be essentially uncrosslinked.

The solution copolymerization is preferably carried out in an aromatic solvent such as xylene, toluene, and the like or in a ketone such as methyl ethyl ketone (MEK), methyl isobutyl ketone, etc. In order to achieve adequate copolymer composition homogeneity it is best to add the acid maleate monomer admixed with the polymerization catalyst to a solution of the vinyl aromatic monomer over a period of time corresponding to about 80% conversion of the monomers to the copolymer. Solution copolymerization with relatively large amounts of free radical catalysts is usually adequate for preparation of uncrosslinked products. Solution or bulk copolymerization as in copending application S.N. 33,376, filed June 2, 1960, by a continuous method of feeding the reactants to a wellstirred reactor and continuous removal of a monomer-polymer solution gives the desired uniform polymer compositions. The copolymer may be isolated by precipitation in a nonsolvent or by devolatilization in some cases.

Where crosslinking is a problem, lower polymerization temperatures or higher solvent concentrations will usually prevent gelation. An alternate route, however, is to react a corresponding homogeneous maleic anhydride copolymer such as is described in copending application 33,376, filed June 2, 1960, with the desired alcohol. This reaction is advantageously carried out in an aromatic or ketonic solvent or solvent blend at about 60° C. and may be speeded by addition of a small amount of an acid catalyst such as p-toluene sulfonic acid or dry HCl.

The homogeneous half ester copolymers useful in the present invention may also be prepared by a process which comprises the linear addition of from 90 to 65, preferably 85 to 70, weight percent of a mixture of the partially esterified maleic acid and polymerization catalyst, with or without the presence of a solvent therefor, to a solution of the vinyl aromatic monomer and from 10 to 35, preferably 15 to 30, weight percent of the partially esterified maleic acid and catalyst in a solvent therefor at a temperature of from 90° to 200° C., preferably 120 to 150° C. at a rate such that the addition is completed when the polymerization has reached 70 to 75 percent conversion of all monomers to copolymeric product. The polymerization may then be completed in the same temperature range. It is desirable that at least 10 weight percent of the half ester be admixed with the vinyl aromatic monomer prior to the onset of polymerization.

If prepared in accordance with the continuous method employing acid maleate monomer feed, the product which has reached 60 to 70% conversion may be removed from the polymerizer and the polymerization thereafter completed to produce a clear, essentially homogeneous product.

The half ester containing copolymers may be converted to half ester and anhydride containing terpolymers by devolatilizing at temperatures between about 150° and 300° C.

The preferred polyepoxides are glycidyl polyethers of aromatic polyhydric compounds having weights per epoxide group of 110 to 550.

Curing catalysts such as tertiary amines or amine salts, quaternary amine bases or salts, or inorganic bases may be used, if desired, to shorten the curing time.

The compositions of the present invention may include other additives such as plasticizers, fillers, pigments and the like. If desired, reactive agents such as epoxy, hydroxy, carboxy, anhydride, and mercapto-containing agents may be employed to obtain desired effects. Examples of such agents include polyesters made from phthalic or adipic acid and ethylene glycol or glycerine; anhydrides such as dodecyl succinic anhydride and trimellitic anhydride, fatty acid mono- or diglycerides; and liquid mercaptan terminated polysulfide polymers. Non-reactive plasticizers and additives such as n-butyl stearate, dioctyl diphenyl oxide, tris butyl phenyl phosphate; glass, cellulosic or synthetic fibers; metal filings, pigments, and inorganic fillers may be added as desired.

Coating and laminating applications normally employ organic solvent solutions of the copolymer-epoxy compositions. The solvent or solvent blend employed is chosen to provide the desired volatility, viscosity, rheology, sprayability and/or other properties.

Organic solvents which are suitable include aromatic hydrocarbons such as toluene and xylene, ketones such as methyl ethyl ketone, methyl isobutyl ketone, diacetone alcohol, and mesitylene oxide, high solvency naphthas, mineral spirits and alcohols, although mineral spirits normally have to be used in admixture with another solvent and the alcohols are not generally as preferred because of their reactivity with anhydride which may be present in the polymer.

Inasmuch as aromatic hydrocarbons provide the most economic solvents for the resins of this invention, a particular advantage is gained by using less than 20 mole percent of maleic anhydride partial ester in the vinyl copolymer. With greater amounts than this, solvent blends are usually required to dissolve the resin and higher viscosity solutions generally result. In addition, at higher maleic content the amount of epoxy resin required to react with the carboxyl groups becomes greater and can lead to overcrosslinking as well as economic disadvantages.

The polyepoxy used to cure or thermoset the vinyl copolymer resin also imparts improved adhesion to a substrate such as glass, metal, wood, etc. This allows even very hard thermoset compositions to exhibit good impact resistance and flexibility in that although crazing may occur, a coating, for example, will still adhere. Flexibility may be increased by incorporating plasticizing additives or by choosing a flexible type epoxy or a mixture thereof with a harder type epoxy.

The thermosetting composition may be cured over the temperature range of from about 20° C. up to about 400° C. At room temperature, the cure may require several months, although catalysts can shorten this to a few days. At elevated temperatures such as exposure to a flame, the cure may be accomplished in less than a minute. Preferred baking temperatures are generally 100 to 200° C. for times of 2 hours to about 10 minutes. The main test of cure is the performance of the cured composition. For example, in coatings optimum hardness adhesion, solvent resistance and impact resistance are gained only with adequate cure, which means in general reaction of epoxy groups with carboxyl groups.

The following examples will further illustrate the present invention but are not to be construed as limiting.

EXAMPLE 1

A polymer containing 2.74 mole percent isooctyl acid maleate, 1.78 mole percent maleic anhydride and 95.5 mole percent styrene was prepared by the continuous coil polymerization method of copending application S.N. 33,376, filed June 2, 1960, using 25 weight percent, based on total non-polymeric constituents in the reaction, of methyl ethyl ketone (MEK) as the solvent. The copolymeric product was dissolved in MEK and individually mixed with the following epoxy resins: Epon 864 (a product having an epoxide equivalent weight of 300–375); Epon 812 (a product having an epoxide equivalent weight of 140–165, an average molecular weight of 300 and a viscosity at 25° C. of 150–210 cps.) in amounts such that the ratio of epoxide to anhydride plus COOH was 0.83. A small amount of Arquad 12 was added to each mixture and thick films were cast in aluminum dishes, allowed to evaporate overnight and then baked 1 hour at 150° C. The films were insoluble in methyl ethyl ketone and had good clarity and hardness.

Similar results were obtained with a similarly prepared copolymer containing 7.05 mole percent isooctyl acid maleate, 1.94 mole percent maleic anhydride and 91.0 mole percent styrene and employing the epoxides in an amount such that the epoxide to anhydride plus COOH ratio was 0.30.

EXAMPLE 2

Homogeneous copolymers of the composition indicated in the following table were prepared by solution polymerization in a flask fitted with a heating mantle, reflux condenser, stirrer, dropping funnel and nitrogen inlet. The solvents used were butanol, xylene, and methyl ethyl ketone or mixtures thereof. The acid maleates and catalysts (t-butyl hydroperoxide, di-t-butyl peroxide and benzoyl peroxide) were added in solution during the course of the polymerization from the dropping funnel while the vinyl aromatic compound and solvent were at reflux (103–148° C.) in the flask.

TABLE I

| Run | Vinyl Aromatic Monomer | Weight (grams) | Acid Maleate | Weight (grams) | Mole Percent Acid Maleate (analysis) |
| --- | --- | --- | --- | --- | --- |
| 1 | Styrene | 163 | Allyl | 37.2 | 13.4 |
| 2 | do | 155 | Cyclohexyl | 45.0 | 13.3 |
| 3 | Vinyl toluene | 230 | Butyl | 50.0 | 11.6 |
| 4 | do | 280 | Lauryl | 70.0 | 8.4 |
| 5 | do | 157 | Stearyl | 123.0 | 20.0 |
| 6 | t-Butyl styrene | 200 | x-Decyl | 47.8 | 13.1 |

Ten gram portions of these copolymers were dissolved in xylene with 0.08 mililiter of Arquad 12, and DER 332 epoxy resin (diglycidyl ether of Bisphenol A) as indicated in the following table. The solutions were cast on tin plate test panels, air dried and baked at 150° C. for 1 hour. The resulting films were of excellent color and clarity, they were highly resistant to marring, had good resistance to crazing when bent on a ¼" mandrel, good solvent resistance (xylene) and passed a Gardner Holdt falling ball impact test of up to 90 inch-pounds.

TABLE II

| Copolymer From Run | Grams DER 332 Epoxy Resin | Epoxide/COOH | Grams Additives | Film Thickness (mils) | Reverse impact test passed in./lbs. |
| --- | --- | --- | --- | --- | --- |
| 1 | 2.53 | 2.0 | 4 0.015 | 1.2 | 30 |
| 2 | 2.43 | 2.0 | 4 0.015 | 1.1 | 30 |
| 3 | 2.58 | 1.43 | | 1.3 | 30 |
| 4 | 1 4.57 | 2.0 | | 1.3 | 30 |
| 4 | 2 4.34 | 1.18 | | 1.1 | 20 |
| 4 | 2 1.22 | 0.33 | 5 1.84 | 1.1 | 20 |
| 4 | 0.82 | 0.67 | 5 0.82 | 1.9 | 10 |
| 5 3 | 2.07 | 1.0 | | 1.2 | 90 |
| 6 | 2.63 | 2.0 | | 1.2 | 30 |

1 Epon 864 epoxy resin.
2 DER 661 bisphenol A, epichlorohydrin condensate having an epoxide equivalent weight of 475–575.
3 p-Dimethylaminomethyl phenol used in place of Arquad 12.
4 Silicon X–520.
5 P–400.

A sample of copolymer of Run 4 was formulated with green pigment as follows:

Polymer _____ grams__ 20
DER 332 epoxy resin (1.18 epoxy/COOH ratio)
                                                grams__ 2.9
$Cr_2O_3$ _____ do____ 7.60
Xylene _____ do____ 10
Arquad 12 _____ ml__ 0.157
X–520 silicone _____ ml__ 0.03

The mix was ground in a ball mill for 48 hours, cast on tin plate test panels and baked at 150° C. for 1¼ hours. The film had excellent craze and mar resistance, did not swell or peel in xylene and passed a reverse impact test of 30 inch-pounds.

EXAMPLE 3

A solid, transparent copolymer of styrene and maleic anhydride, containing 15.0 mole percent of maleic anhydride and having a solution viscosity of 3.49 cps. was reacted with a stoichiometric amount of x-isodecyl alcohol (oxo process) at 200 to 230° C. in the melt for about 4 hours to produce a copolymer containing 27.8 weight percent of isodecyl acid maleate. In the following table this copolymer is designated as copolymer 1.

Another sample of the above styrene-maleic anhydride copolymer (25 kg.) was dissolved in 29.72 kg. of a mixture of 90/10 xylene-methyl ethyl ketone by weight, in a 20 gallon drum. Isooctyl alcohol (4.72 kg.) was added with 150 grams of p-toluene sulfonic acid. After mixing a week the alcohol was fully reacted as indicated by infrared analysis. (Copolymer 2.)

In a similar manner the following copolymers were prepared:

| | Mole percent Maleic Anhydride | Mole percent Isooctyl Alcohol | Weight percent Isooctyl Acid Maleate | Weight percent Maleic Anhydride |
| --- | --- | --- | --- | --- |
| Copolymer: | | | | |
| 3 | 4.11 | 100 | 8.6 | 0 |
| 4 | 7.21 | 100 | 14.6 | 0 |
| 5 | 20.0 | 100 | 35.5 | 0 |
| 6 | 7.21 | 400 | 14.6 | 0 |
| 7 | 7.21 | 200 | 14.6 | 0 |
| 8 | 7.21 | 80 | 11.9 | 1.25 |
| 9 | 7.21 | 66 | 10.0 | 2.15 |
| 10 | 7.21 | 50 | 7.67 | 3.26 |

Ten gram samples of these copolymers were dissolved in xylene with DER 332 epoxy resin and 0.3 weight percent, based on solids, of tri(dimethylaminomethyl) phenol (DMP–30) as indicated and cast coatings were baked and tested as in Example 2. The resulting coatings were clear, highly resistant to marring, and had good resistance to xylene.

| | Grams DER 332 Epoxy Resin | Epoxide/Anhydride+ COOH | Reverse impact passed, in./lbs. | Film Thickness, mils |
| --- | --- | --- | --- | --- |
| Copolymer: | | | | |
| 1 | 4.20 | 2.0 | 80 | 1.5 |
| 2 | 0.53 | 0.25 | 90 | 1.3 |
| 3 | 1.32 | 0.20 | 90 | 0.9 |
| 4 | 1.12 | 1.0 | 90 | 1.0 |
| 5 | 3.86 | 1.43 | 90 | 1.0 |
| 6 | 2.28 | 1.0 | 90 | 0.9 |
| 7 | 1.58 | 1.43 | 90 | 0.8 |
| 8 | 1.34 | 1.25 | 90 | 0.8 |
| 9 | 1.72 | 1.43 | 90 | 0.9 |
| 10 | 1.10 | 1.0 | 90 | 1.0 |

EXAMPLE 4

In a manner similar to that of Example 3, 100 parts of a copolymer containing 75 weight percent dichlorostyrene and 25 weight percent isooctyl acid maleate (100% esterified) with 19 parts DER 332 epoxy resin and 0.5 part of DMP–30 was dissolved in MEK to 40% solids. Glass cloth (weave 181 with Volan-A Finish) was saturated with the above solution by continuous dipping and allowing to dry for 24 hours. Final weight ratio of glass/resin was 69/31. Twelve plys of the above impregnated cloth were stacked and placed in a flat press at 300° F. After 14 seconds at 50 p.s.i. the pressure was dropped for breathing and then raised to 300 p.s.i. for 30 minutes, cooled 10 minutes by water coils in press and removed at 250° F. The resulting laminate was hard, stiff and structurally sound. It would not burn when removed from an open flame used to ignite it.

EXAMPLE 5

For comparative purposes the following compositions were prepared:

(A) Copolymer of 86.8 mole percent styrene, 13.2 mole percent iso-octyl acid maleate, prepared by the continuous coil polymerization method of copending application S.N. 33,376 filed June 2, 1960, using xylol as the solvent.

(B) Copolymer of 86.8 mole percent styrene, 13.2 mole percent iso-octyl acid maleate, prepared by the method of Example 1 of U.S. Patent 2,967,162 and using "Solvesso" 100 as solvent.

(C) Copolymer of 66.8 mole percent styrene, 20.0 mole percent ethyl acrylate, 13.2 mole percent iso-octyl acid maleate, prepared by the method of Example 1 of U.S. Patent 2,967,162 and using "Solvesso" 100 as solvent.

The let-down solvent in each case was xylol. Portions of the sample were devolatilized for 1.5 hours at 140° C. @ 2 mm. Hg pressure absolute. The percent solids were 54.6, 54.4 and 55.1 respectively. Polymer A had excellent clarity, polymer B was opaque and polymer C was cloudy. Phase contrast photomicrography showed a very smooth and even consistency for polymer A, and a very non-homogeneous consistency for polymers B and C, with the distinctions somewhat less sharp for polymer C.

The polymers were individually formulated with Dow Epoxy Resin D.E.R.® 332 as follows:

| | A | B | C |
|---|---|---|---|
| Wt. Solution for 84.0 gms. solids | 154 | 154 | 152 |
| Gms. epoxy resin (1 epoxy/1 COOH) | 16 | 16 | 16 |
| Gms. Dimethyl formamide | 20 | 20 | 20 |
| Gms. Cellosolve acetate | 32 | 32 | 34 |
| Solution solids | 45 | 45 | 45 |
| Solution clarity | (1) | (2) | (3) |
| Gms. BF₃ Piperidene complex | 0.50 | 0.50 | 0.50 |

[1] Very clear.  [2] Opaque.  [3] Cloudy.

Films of 1.0–1.3 mils thickness were cast on polished Bonderite 1000, baked 30 minutes at 350° F. and tested as follows:

| 1.5 hours xylol immersion | Slight loss of gloss | Film swollen and partially dissolved. | Film soft and cheesy. |
|---|---|---|---|
| (Ambient temperature) | Good mar resistance | No mar resistance | Poor mar resistance. |
| Xylol, 30 rubs with tissue | Slight loss of gloss | Rubbed off | Most rubbed off. |
| Blue RIT dye 160° F., 1 Hr | Slight stain | Slight stain | Severe stain. |
| 5% NaOH, 24 Hr | No effect | Slight blushing | Slight blushing. |

It is thus seen that the products of this invention are greatly superior to prior art products, both as to film clarity and in resistance to staining and solvents.

What is claimed is:

1. A compatible thermosetting resin coating and laminating composition consisting of (A) a homogeneous copolymer of from (1) 67 to 97 mole percent of a vinylidene aromatic compound and (2) correspondingly, from 33 to 3 mole percent of an α,β-unsaturated dicarboxylic acid anhydride, wherein at least 90 percent of the copolymer has an anhydride component composition within a range of 5%, which is monoesterified from 50 to 120 mole percent with a member of the group consisting of primary and secondary alkyl, cycolalkyl, and benzenoid aromatic alcohols containing from 1 to 21 carbon atoms and $C_3$ to $C_4$ unsaturated aliphatic primary and secondary alcohols having the C=C grouping at least 1 carbon removed from the hydroxyl group; and (B) an epoxide which is a glycidyl polyether of aromatic polyhydric compounds and has an epoxy equivalent weight of 110 to 550.

2. Composition of claim 1 wherein the vinylidene aromatic copolymer contains at least 50 weight percent of the vinyl aromatic monomer.

3. Composition of claim 2 containing at least 60 weight percent of the homogeneous vinyl aromatic copolymer.

4. Composition of claim 3 wherein the vinyl aromatic-acid anhydride polymer has a molecular weight characterized by 10% solution viscosity in methyl ethyl ketone at 25° C. of 0.5 to 20 cps.

5. Composition of claim 1 wherein the ratio of epoxide to anhydride, including COOH, groups is from 0.2 to 2.5.

6. Composition of claim 4 wherein the vinyl aromatic copolymer contains from 5 to 20 mole percent of the esterified α,β-unsaturated dicarboxylic acid anhydride.

7. Composition of claim 1 wherein the acid anhydride is maleic anhydride which is esterified with isooctyl alcohol and the vinyl aromatic compound is styrene.

8. Composition of claim 7 wherein the epoxy compound is the diglycidyl ether of Bisphenol A.

9. An article having on at least one surface a thin, tough continuous and adherent baked-on coating consisting essentially of the composition of claim 1.

10. A laminate structure comprising at least two layers joined together by, and integrally bound with, a tough, adherent, cured adhesive consisting essentially of the composition of claim 1.

References Cited

UNITED STATES PATENTS

| 2,967,162 | 1/1961 | Vasta | 260—21 |
| 2,977,334 | 3/1961 | Zopf et al. | 260—837 |
| 2,949,438 | 8/1960 | Hicks | 260—45.5 |
| 3,046,246 | 7/1962 | Muskat | 260—30.4 |

FOREIGN PATENTS

| 963,943 | 7/1964 | Great Britain. |

OTHER REFERENCES

A. W. Hanson and R. L. Zimmerman, Ind. and Eng. Chem., 49(11), November 1957, pp. 1803–1806.

MORRIS LIEBMAN, *Primary Examiner.*

J. E. CALLAGHAN, *Assistant Examiner.*

U.S. Cl. X.R.

260—836, 37, 33.6, 33.4, 32.8, 78.5